(12) United States Patent
Nathan et al.

(10) Patent No.: US 12,530,355 B1
(45) Date of Patent: Jan. 20, 2026

(54) PREDICTING A FUTURE WORKLOAD FOR SCALING DATABASE PROCESSING RESOURCES FOR SATISFYING A PERFORMANCE OBJECTIVE

(71) Applicant: Amazon Technologies, Inc., Seattle, WA (US)

(72) Inventors: Vikram Nathan, Somerville, MA (US); Balakrishnan Narayanaswamy, San Jose, CA (US); Andreas Michael Kipf, Munich (DE); Tim Kraska, Arlington, MA (US)

(73) Assignee: Amazon Technologies, Inc, Seattle, WA (US)

( * ) Notice: Subject to any disclaimer, the term of this patent is extended or adjusted under 35 U.S.C. 154(b) by 40 days.

(21) Appl. No.: 18/518,908

(22) Filed: Nov. 24, 2023

(51) Int. Cl.
*G06F 16/21* (2019.01)
*G06F 16/2453* (2019.01)

(52) U.S. Cl.
CPC ...... *G06F 16/24545* (2019.01); *G06F 16/217* (2019.01)

(58) Field of Classification Search
None
See application file for complete search history.

(56) References Cited

U.S. PATENT DOCUMENTS

| | | |
|---|---|---|
| 10,402,733 B1 * | 9/2019 | Li ........................... G06N 20/20 |
| 11,422,982 B2 * | 8/2022 | Kulesza .................. G06F 9/505 |
| 11,544,288 B2 | 1/2023 | Horowitz et al. |
| 11,727,003 B2 | 8/2023 | Saxena et al. |
| 2015/0113120 A1 * | 4/2015 | Jacobson .............. G06F 9/5088 709/224 |
| 2017/0213257 A1 * | 7/2017 | Murugesan ........ G06Q 30/0275 |
| 2023/0153165 A1 * | 5/2023 | Higginson .......... G06F 11/3442 718/104 |

* cited by examiner

*Primary Examiner* — Scott A. Waldron
(74) *Attorney, Agent, or Firm* — S. Scott Foster; Kowert, Hood, Munyon, Rankin & Goetzel, P.C.

(57) ABSTRACT

A future workload may be predicted for a database system to make a scaling determination based on a performance objective. A performance budget for a database system may be determined and used to select different scaling decisions that may reconfigure a current processing cluster of the database system or add a new processing cluster to the database system to provide further access to a database.

20 Claims, 10 Drawing Sheets

PREDICTING A FUTURE WORKLOAD FOR SCALING DATABASE PROCESSING RESOURCES FOR SATISFYING A PERFORMANCE OBJECTIVE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
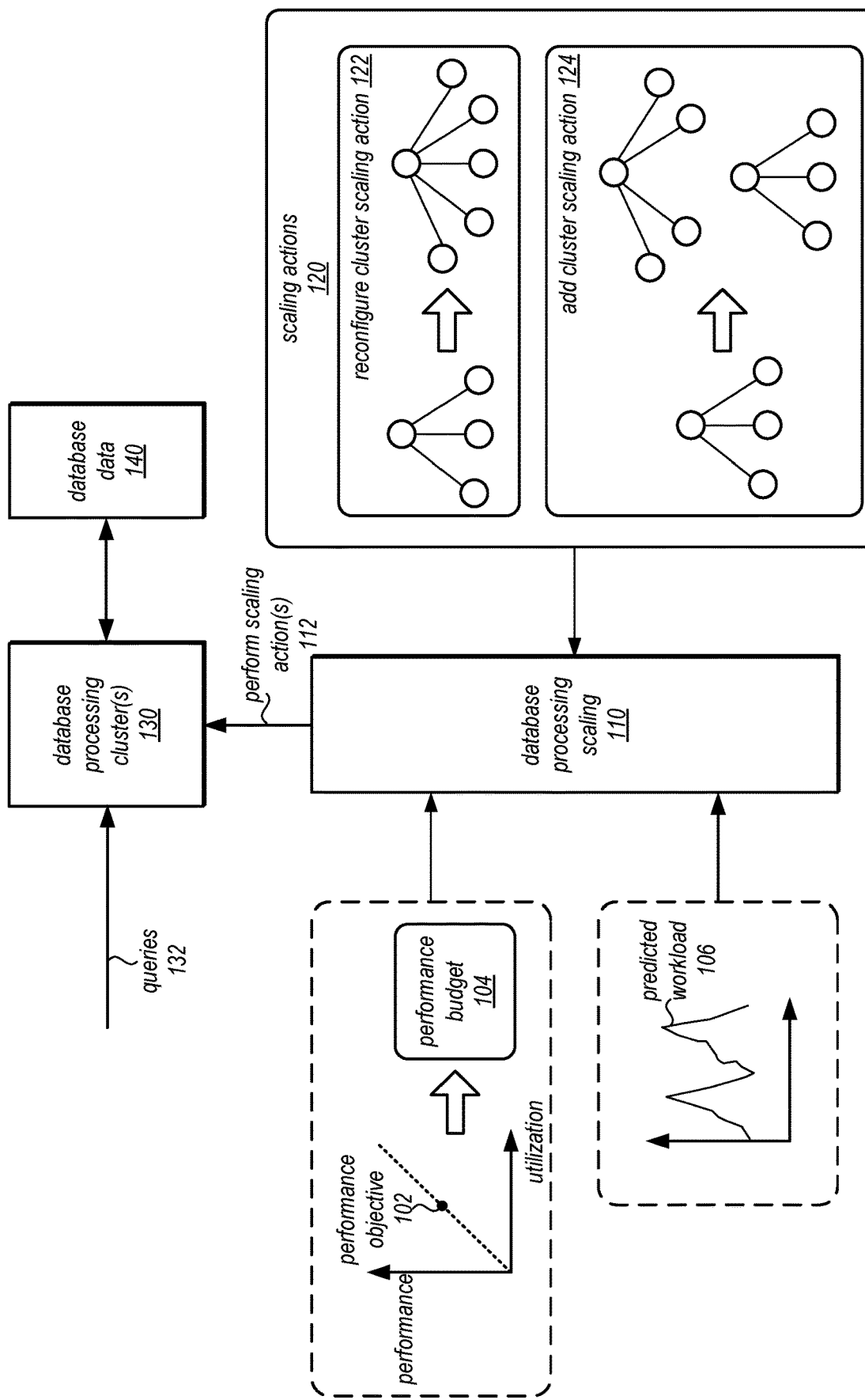
FIG. 1 illustrates a logical block diagram of predicting a future workload for scaling database processing resources for satisfying a performance objective, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of predicting a future workload for scaling database processing resources for satisfying a performance objective, according to some embodiments are described herein. Serverless database offerings aim to provide high performance and low cost with minimal intervention on configuration of a database system by users. Current techniques, however, do not always meet this goal. For example, users choose a serverless cluster size which gives them high enough performance at low enough cost as determined by running experiments with different cluster configurations. After this initial determination is made, serverless resources increase only with number of concurrent users, without user intervention, via scaling to add additional clusters to provide access to a database. However, users may have to perform a new analysis whenever workload characteristics change (e.g., the underlying data size may increase or the distribution of "large" vs "small" queries in a workload shifts). Additionally, achieving the lowest cost and best performance on a heterogeneous workload may require using heterogeneous hardware (e.g. different cluster sizes); to do this, users would need to set up multiple workgroups and a fixed assignment of users to each workgroup. The workgroup configurations and assignment would also need to change as workload properties change.

Given the number of variables in providing a right-sized amount of resources for providing access to a database that offers a serverless experience, techniques that make use of predicting a future workload for scaling database processing resources and can, with greater efficiency achieve better database system performance with significantly less user intervention. For example, techniques that predict future workload for scaling database processing resources can be used to analyze a database's workload to choose the best time-varying set of resources that provides the best performance for that workload within a database user's budget. It removes the users need to experiment with different database system configurations (e.g., cluster size and/or performance capabilities) by selecting the appropriate computing resources for each workload without user intervention. Thus, one of ordinary skill in the art may appreciate that the above techniques provide improvements to computer and database-related technologies.

FIG. 1 illustrates a logical block diagram of predicting a future workload for scaling database processing resources for satisfying a performance objective, according to some embodiments. Database processing scaling 110 may be implemented for a database system (e.g., a standalone database system or a database service like database service 210 in FIG. 2). Database processing scaling 110, may take information such as a performance budget 104 (e.g., determined according to a user-specified performance objective 102) and a predicted workload 106 (e.g., determined based on historical database workloads), to make scaling decisions for one or more database processing clusters 130, as discussed in detail below with regard to FIGS. 5 and 7. Database processing clusters 130 may provide access to database data 140 (e.g., performing one or more queries 132).

Different scaling actions 120 may be selected, as exemplified below with regard to FIGS. 6A and 6B. One scaling action, is reconfigure cluster scaling actions 122. Reconfiguring may include increasing, decreasing, replacing, or otherwise modifying the nodes in a processing cluster. Modifications to reconfigure may include adding or including nodes with different computing resources capacities (e.g., greater or lesser memory, processor, etc.). Add cluster scaling action 124 may add an additional processing cluster, which may be forwarded some of queries 132 to relieve some of the workload off of database processing cluster(s) 130.

Database processing scaling 110 may making scaling actions to adapt database processing clusters for various scenarios. Consider an example where a database user has short dashboard queries during the day (8 am-8 pm) and a singly large ELT job that begins at 5 am and must complete by 8 am. Database processing scaling 110 will resize a main cluster of database processing clusters to a small cluster to handle dashboard queries, and it will scale to add additional clusters to perform the ELT job. The size of the additional cluster may depend on the performance objective (e.g., a more aggressive performance objective that sacrifices on utilization, such as higher utilization amounts of resources resulting in a higher cost) would usually correspond to larger cluster). As discussed below with regard to FIG. 5, query predictors can be used to determine and how well a query will scale with cluster size. For example, if a prediction of query performance for the large ETL job is made that it will run more than twice as fast on a 32 node cluster compared to 16 node cluster, then a 16 node additional cluster would not be used for this ETL job given any performance setting (since 32 node cluster is both faster and more efficient in resource utilization).

In another example, a database user has short dashboard queries during the day (8 am-8 pm) with large queries to external database tables interspersed during the day. The dashboard queries may not scale well, e.g. run slower on larger clusters. There are multiple options depending on the performance objective. If the performance object emphasizes performance over utilization efficiency, the database processing scaling 110 will start an additional cluster for the external table queries alone, while keeping shorter queries on the main cluster. If a workload is repeated with database processing scaling 110, the average execution time of queries in both runs is the same (P99 within 10%). Database users can manually resize Database processing scaling workgroups. If the performance objective is balanced (e.g., between utilization and performance), database processing scaling 110 might start an additional cluster for the duration of the external table queries and use it for dashboard queries as well, leaving main idle so it doesn't incur added cost. This would incur added latency for dashboard queries during these external table query periods. If the performance objective emphasizes utilization, database processing scaling might simply run everything on the main cluster. This would cause the external table queries to suffer but is likely the most efficient utilization of resources.

In another example, a database user runs short-medium queries best suited for a 4 node cluster but gets a sudden large burst of short queries that cause queue buildup. Database processing scaling 110 measures queuing delay and will a start an additional cluster that is best suited to handle the recent burst. The queuing delay threshold at which a new burst will be triggered depends on the size of additional cluster and the performance objective. If the performance objective emphasizes high performance, database processing scaling 110 will more aggressively take decisions that improve performance. For example, at a medium setting (e.g., balanced performance objective between performance and utilization), database processing scaling 110 might start an additional cluster when queue time exceeds an additional cluster prepare time. At a high performance objective, the threshold might be half of the prepare time. Database processing scaling 110 may predict that a smaller additional cluster is better, since the burst is mostly short queries. In this case, the queueing threshold may be lower since a smaller cluster is more efficient utilization.

In another example, a long query arrives and there are already additional clusters added to the main cluster for a database. If at least one additional cluster matches the optimal size database processing scaling 110 designates for this query, the query will be run on that cluster. Otherwise, database processing scaling 110 evaluates the benefit of running the query on an existing cluster with the benefit of a new additional cluster (which includes penalties for prepare delay). Suppose the optimal cluster size for this query is 16 node cluster. If a 32 node cluster is attached, and the 16 node cluster is nearly twice the runtime (so approximately the same utilization of resources (e.g., cost)), Database processing scaling 110 will choose the 32 compute node cluster. If, instead, an 8 node cluster cluster is attached and the 16 node cluster won't be appreciably faster, the 8 node cluster may be chosen.

Please note that the previous description of a database service is a logical description and thus is not to be construed as limiting as to the implementation of a query processing configurations, a database service, database data, and performance of queries, or portions thereof.

This specification continues with a general description of a provider network that implements multiple different services, including a database service and storage service, which may implement scaling query processing resources for efficient utilization and performance. Then various examples of the database service and storage service, including different components/modules, or arrangements of components/module that may be employed as part of implementing the services are discussed. A number of different methods and techniques to implement scaling query processing resources for efficient utilization and performance are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
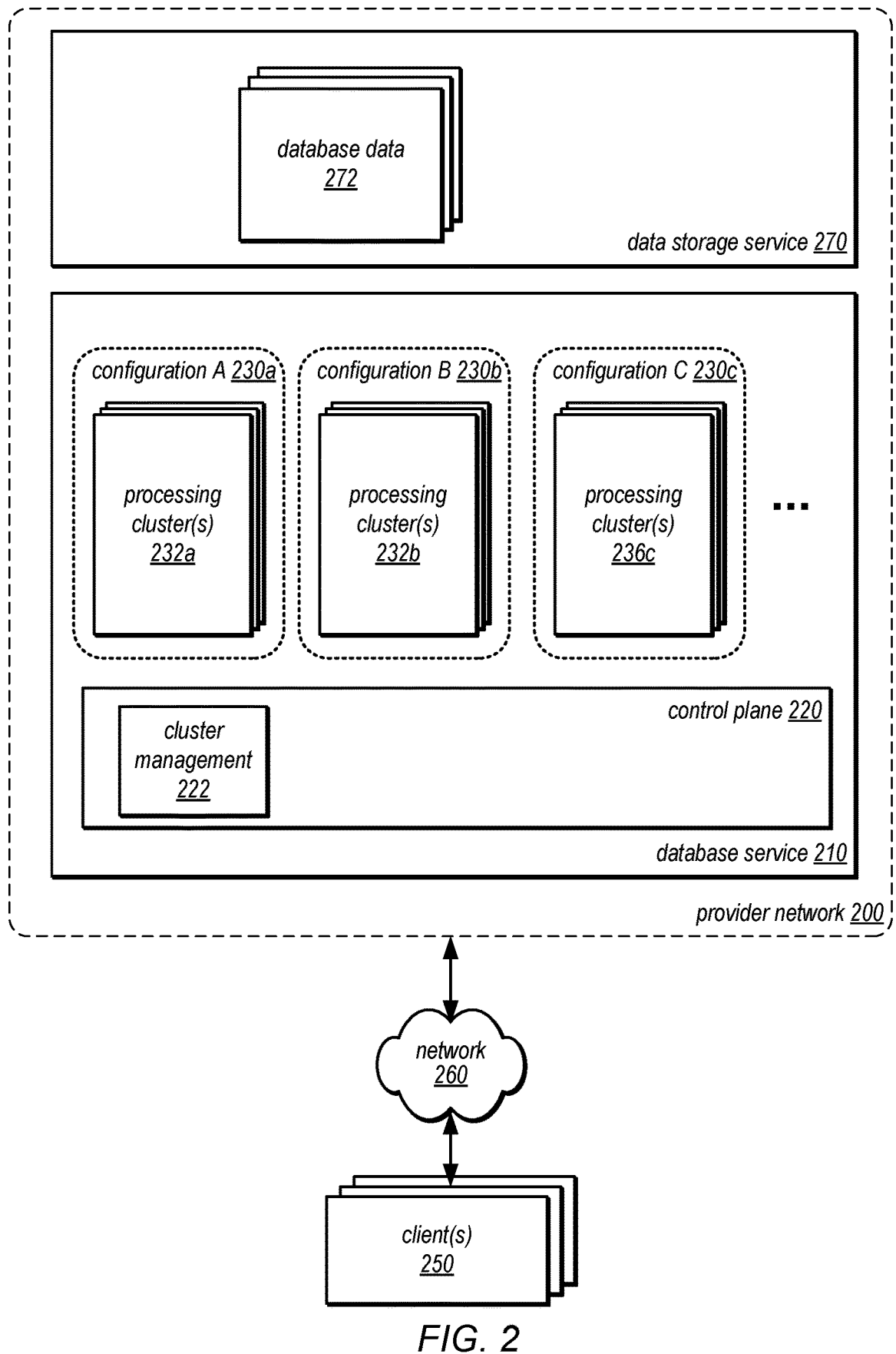
FIG. 2 is a logical block diagram illustrating a provider network offering a database service that implements predicting a future workload for scaling database processing resources for satisfying a performance objective for databases managed by the database service, according to some embodiments.

FIG. 2 is a logical block diagram illustrating a provider network offering a database service that implements predicting a future workload for scaling database processing resources for satisfying a performance objective for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Database users can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of database users within a certain latency requirement, a set of servers provided to a database user's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to database users on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes database user resources that are implemented on the cloud provider network (e.g., computing instances, containers, block storage volumes, databases, file storage). Data plane traffic generally includes non-administrative operations such as transferring database user data to and from the database user resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis, as discussed in detail below with regard to FIGS. 3-7.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 2210 may be a data warehouse service. Thus in the description that follows database service 210 may be discussed according to the various features or components that may be implemented as part of a data warehouse service, including control plane 220, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 9. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or database users, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

Processing clusters, such as processing clusters 232a, 232b, and 232c, hosted by database service 210 may provide an enterprise-class database query and management system that allows users to send data processing requests to be executed by the clusters 232, such as by sending a query.

Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230a, B 230b, and C 230c, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster" or "main cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
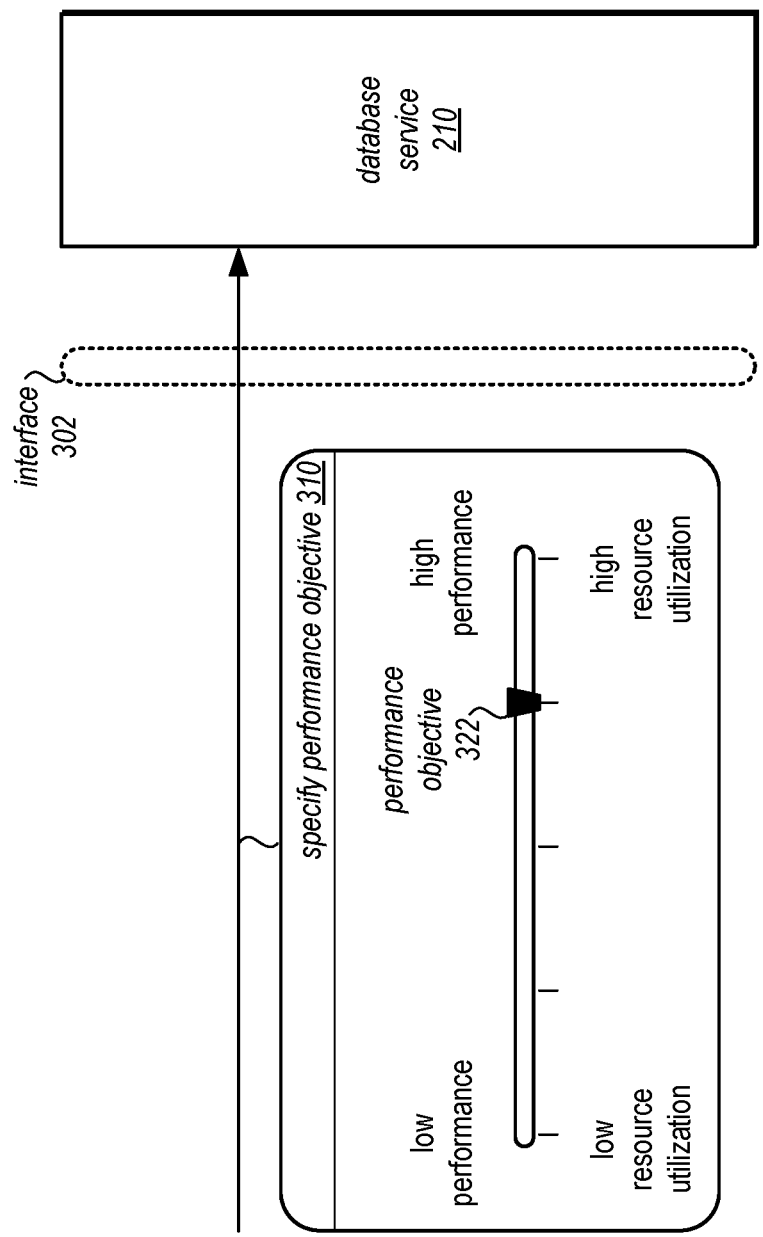
FIG. 3 is a logical block diagram illustrating an example interface for specifying a performance objective, according to some embodiments.

FIG. 3 is a logical block diagram illustrating an example interface for specifying a performance objective, according to some embodiments. A request via an interface 302 of database service 210 may utilize many different parameters to specify a performance objective. For example, a command line interface or API may allow for specific ranges or values of the performance objective to be made. In some embodiments, as illustrated in FIG. 3, a graphical user interface may be used, including a slider element which may allow for a performance objective 322 to visually represented between different objective choices. Other graphical user interface elements, such as a drop down menu may be used in other embodiments. Different settings of performance objective 322 may, in some embodiments, determine features such as a performance budget and/or the aggressiveness with which some scaling decisions are made (e.g., to more aggressively scale to use more resources, at greater cost, or to less aggressively scale, biasing scaling decisions to, when possible, choose more efficient, lower resource utilization.

Figure 4:
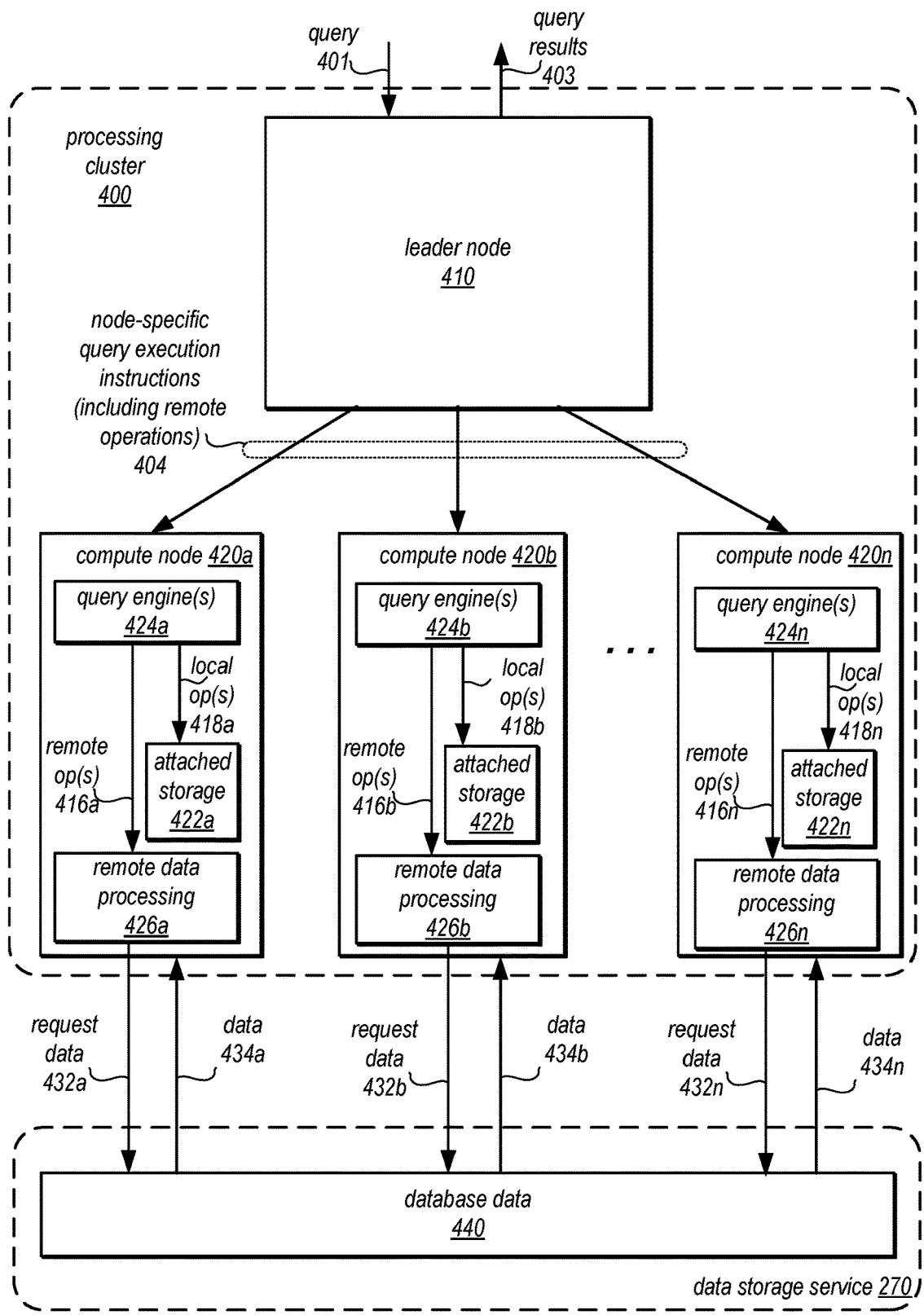
FIG. 4 is a logical block diagram illustrating an example processing cluster of a database service, according to some embodiments.

FIG. 4 is a logical block diagram illustrating an example processing cluster of a database service, according to some embodiments. Processing cluster 400 may be query processing cluster, like processing clusters 232 discussed above with regard to FIG. 2, that distributes execution of a query among multiple computational (which may also be referred to as "compute") nodes. As illustrated in this example, a processing cluster 400 may include a leader node 410 and compute nodes 420*a*, 420*b*, and 420*n*, which may communicate with each other over an interconnect (not illustrated). Leader node 410 may implement query planning 412 to generate query plan(s), query execution 414 for executing queries on processing cluster 400 that perform data processing that can utilize remote query processing resources for remotely stored data (e.g., by utilizing one or more query execution slot(s)/queue(s) 417). As described herein, each node in a primary processing cluster 400 may include attached storage, such as attached storage 422*a*, 422*b*, and 422*n*, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

Leader node 410 may manage communications with clients, such as clients 250 discussed above with regard to FIG. 2. As discussed above with regard to FIG. 3, leader node 410 may communicate with proxy service 240 and may receive query 401 and return query results 403 to proxy service 240 (instead of communicating directly with a client application). Alternatively, in those embodiments where leader node 410 implements database query queue 320 and query routing 330 as a primary cluster, then leader node 410 may act as the proxy for other, secondary clusters, attached to the database, and may return query results directly to a client application.

Leader node 410 may be a node that receives a query 401 from various client programs (e.g., applications) and/or subscribers (users) (either directly or routed to leader node 410 from proxy service 240), then parses them and develops an execution plan (e.g., query plan(s)) to carry out the associated database operation(s)). More specifically, leader node 410 may develop the series of steps necessary to obtain results for the query. Query 401 may be directed to data that is stored both locally within processing cluster 400 (e.g., at one or more of compute nodes 420) and data stored remotely. Leader node 410 may also manage the communications among compute nodes 420 instructed to carry out database operations for data stored in the processing cluster 400. For example, node-specific query instructions 404 may be generated or compiled code by query execution 414 that is distributed by leader node 410 to various ones of the compute nodes 420 to carry out the steps needed to perform query 401, including executing the code to generate intermediate results of query 401 at individual compute nodes may be sent back to the leader node 410. Leader node 410 may receive data and query responses or results from compute nodes 420 in order to determine a final result 403 for query 401.

A database schema, data format and/or other metadata information for the data stored among the compute nodes, such as the data tables stored in the cluster, may be managed and stored by leader node 410. Query planning 412 may account for remotely stored data by generating node-specific query instructions that include remote operations to be directed by individual compute node(s). Although not illustrated, in some embodiments, a leader node may implement burst manager to send 406 a query plan generated by query planning 412 to be performed at another attached processing cluster and return results 408 received from the burst processing cluster to a client as part of results 403.

In at least some embodiments, a result cache 419 may be implemented as part of leader node 410. For example, as query results are generated, the results may also be stored in result cache 419 (or pointers to storage locations that store the results either in primary processing cluster 400 or in external storage locations), in some embodiments. Result cache 419 may be used instead of other processing cluster capacity, in some embodiments, by recognizing queries which would otherwise be sent to another attached processing cluster to be performed that have results stored in result cache 419. Various caching strategies (e.g., LRU, FIFO, etc.) for result cache 419 may be implemented, in some embodiments. Although not illustrated in FIG. 4, result cache 419 could be stored in other storage systems (e.g., other storage services, such as a NoSQL database) and/or could store sub-query results.

Processing cluster 400 may also include compute nodes, such as compute nodes 420a, 420b, and 420n. Compute nodes 420, may for example, be implemented on servers or other computing devices, such as those described below with regard to computer system 1000 in FIG. 9, and each may include individual query processing "slices" defined, for example, for each core of a server's multi-core processor, one or more query processing engine(s), such as query engine(s) 424a, 424b, and 424n, to execute the instructions 404 or otherwise perform the portions of the query plan assigned to the compute node. Query engine(s) 424 may access a certain memory and disk space in order to process a portion of the workload for a query (or other database operation) that is sent to one or more of the compute nodes 420. Query engine 424 may access attached storage, such as 422a, 422b, and 422n, to perform local operation(s), such as local operations 418a, 418b, and 418n. For example, query engine 424 may scan data in attached storage 422, access indexes, perform joins, semi joins, aggregations, or any other processing operation assigned to the compute node 420.

Query engine 424a may also direct the execution of remote data processing operations, by providing remote operation(s), such as remote operations 416a, 416b, and 416n, to remote data processing clients, such as remote data processing client 426a, 426b, and 426n. Remote data processing clients 426 may be implemented by a client library, plugin, driver or other component that sends request subqueries to be performed by data storage service 220 or requests to for data, 432a, 432b, and 432n. As noted above, in some embodiments, Remote data processing clients 426 may read, process, or otherwise obtain data 434a, 434b, and 434c, in response from database data 440 in data storage service 270, which may further process, combine, and or include them with results of location operations 418.

Compute nodes 420 may send intermediate results from queries back to leader node 410 for final result generation (e.g., combining, aggregating, modifying, joining, etc.). Remote data processing clients 426 may retry data requests 432 that do not return within a retry threshold.

Attached storage 422 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 5:
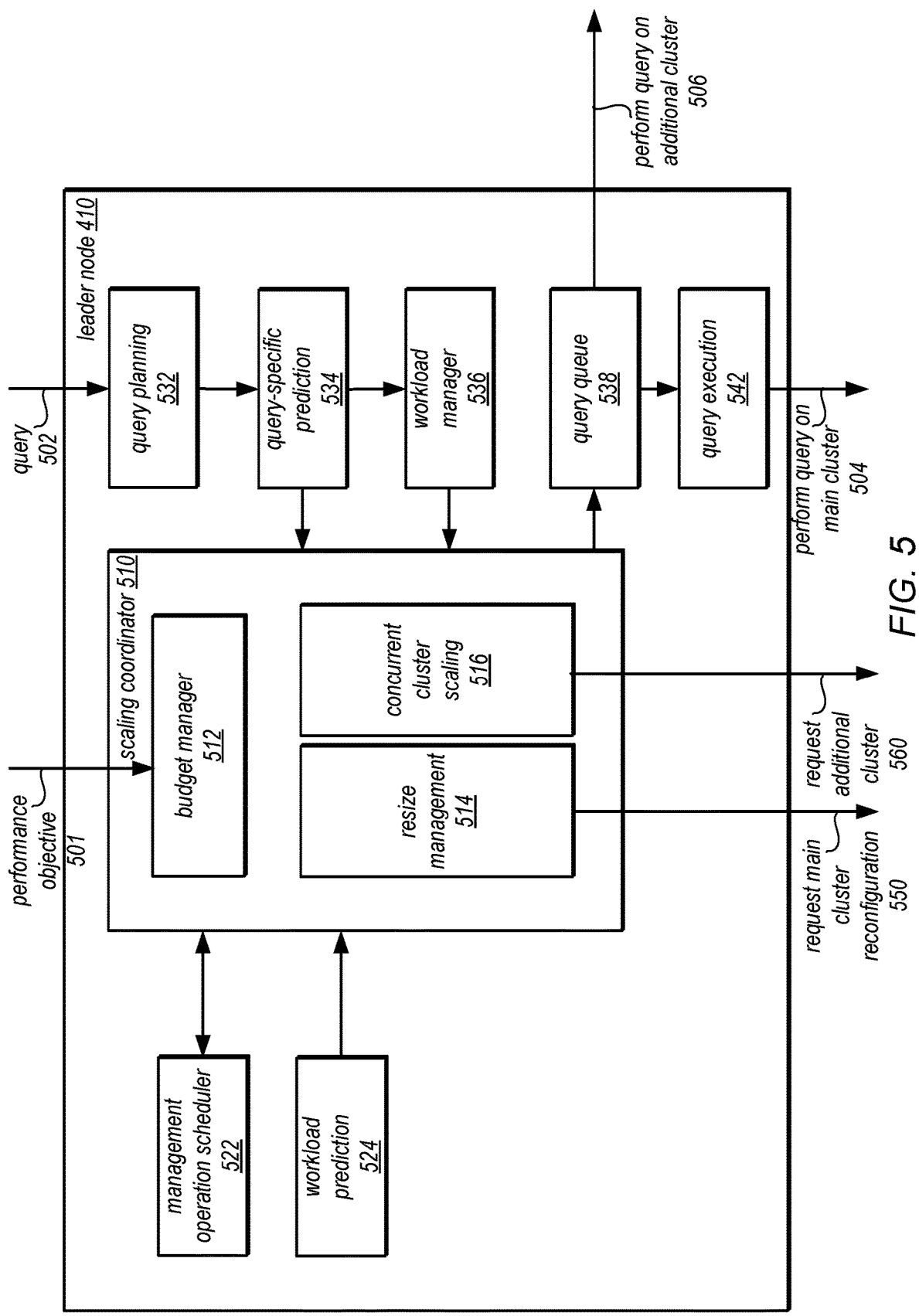
FIG. 5 is a logical block diagram illustrating an example leader node that implements predicting a future workload for scaling database processing resources for satisfying a performance objective, according to some embodiments.

FIG. 5 is a logical block diagram illustrating an example leader node that implements predicting a future workload for scaling database processing resources for satisfying a performance objective, according to some embodiments. Leader node 410 may implement scaling coordinator 510. Scaling coordinator 510 may implement budget manager 512 which may obtain a specified performance objective 501 and determine a performance budget to provide to resize management 514 and concurrent cluster scaling 516. Performance objective 501 may, in some embodiments, correspond to different scaling aggressiveness levels. For example, pre-populated "levels" for example, may correspond to a hard-coded aggressiveness, A, the number of database processing unit (DPU)-seconds the database user can use per GB of the underlying tables touched by the query workload. Each query adds [A*(scan size in GB)] DPU-seconds to the budget. For example, if the user workload consists of 1000 queries, each of which scans a 100 GB table, and A=0.5 then scaling coordinator 510 can use a budget of 50,000 DPU-seconds to run this workload. The budget is passed to resize management and to concurrent scaling cluster scaling 516, to make sure additional clusters are not added if the budget would be exceeded (so a main cluster size is not chosen that is too large). Budget manager 512 can report up-to-date remaining budget values (e.g., DPU) in some embodiments. In some embodiments, the budget may be also determined based on workload forecast.

Management operation scheduler 522 may help to schedule when background operations, including some scaling actions are performed. Workload prediction 524 may use historical data apply a machine learning model and generate prediction of future workloads over time. Workload prediction may occur for various time horizons (e.g., next hour, next 24 hours, etc. and offer amounts of work for periods within different horizons (e.g., predicted resources utilized within 5 minute intervals). Resize management 514 may change cluster configuration based on predicted workload (e.g., at specified intervals or times when the resize evaluation is triggered (e.g., every 24 hrs). Concurrent cluster scaling 516 likewise may request an additional cluster 560 in anticipation of a query workload to add further query processing capacity.

Scaling coordinator 510 may determine which cluster, either main or a specific additional cluster, the query should run on, and creating such a cluster if necessary. For each query, scaling coordinator 510 determines whether that query should scale based on its predicted execution time and predicted peak memory usage, or whether the queuing time is large enough to merit starting a new cluster. For example, concurrent cluster scaling 516 may also perform on-demand scaling when queries are received. For example, a query 502 may be received and a query plan generated at 532. Then query specific predictions of various computing resources and performance of the query may be made, as indicated at 534.

For example, query-specific prediction 534 may be made using one or more machine learning models that may be trained to predict query execution performance, both on the current main cluster (and an additional clusters already provisioned for the database) but on other potential clusters with different configurations. For example, query-specific prediction 534 may include peak memory predictors (e.g., how much memory will this query consume at its peak), run time predictors (e.g., how long will this query take on a different cluster size), and command-specific predictors (e.g. COPY, external table, etc.).

The following description provides for an example embodiment of predictors providing query specific prediction 534. When making a prediction of execution time for a given query q to be executed on a s nodes cluster, there are two possible models to use. First, is a globally trained scaling model $M_g$ that was trained offline to directly predict execution time of a given query at any allowed scale $s \in S = \{4, 8, 16, 32, 64, 128\}$ and second is a local scaling model KNN, $M_r$, which is a prediction based on the actual execution time observed in the past r repetitions at the current main cluster. It may be that $M_r$ is better than $M_g$ in terms of absolute execution time, when q is a repeating query and have seen more than r repetitions at the main cluster. However, $M_g$ was trained with much more data and is expected to better capture the scalability of the query, e.g., the trend of execution time at different scales.

Scaling coordinator 510 may be targeted to optimize the overall/mean utilization (e.g. price)-performance. So, instead of greedily picking the best price-performance for each query, it may be formulated as a Multi-Armed Bandit problem and use Thompson sampling to balance exploration and exploitation, and the controller may need uncertainty of each prediction to formulate the prior and likelihood distribution of price-performance objective.

In some embodiments, an ensemble prediction technique may be used for query-specific prediction 534. For example, for a given query q, $M_g$ makes prediction for all possible scales $s \in S$ and $M_r$ makes prediction for a subset of scales $s \in S_r \subseteq S$. To fuse $M_g(q,S)$ and $M_r(q,S_r)$ so that (1) the trend of $M_g(q,S)$ is preserved and (2) the revised predictions are closer to $M_r(q,S_r)$. Accordingly, there may be multiple methods to get the predicted value and the uncertainty. A first method may be to find the weight w and to minimize L where $L(q,S_r) = \Sigma_{s \in S_r} \|M_g(q,S) - M_r(q,s)\|^2$. Then, $M'_g = wM_g(q,s)$ as the ensemble model to make prediction $s \in S$. The solution to w may be described as:

$$\operatorname{argmin}_w L( = \frac{\sum_{s \in S_r} M_r(q,s) M_g(q,s)}{\sum_{s \in S_r} M_g(q,s)^2}.$$

Another method may be described as: $L(q,S) = \Sigma_s \Sigma_i \|w_i M_g(q,s) - M_r(q,s)\|^2 + \lambda \Sigma_s \|w_i - 1\|$. Uncertainty can be obtained using different techniques, such as Quantile loss and Gaussian process.

In some embodiments, scaling coordinator 510 may use a formulation to assign query performance locations, alpha-price-performance ($PP_\alpha$) for a query q, cluster size c and runtime $R(q,c)$:$PP_\alpha(q,c) = R(q,c) \cdot c^\alpha$. In this formulation, a may be used to be the aggressiveness, the higher it is the more performance prioritized and the lower it is the more resource utilization efficiency (e.g., lower cost) is prioritized. The value of a may be determined according to a workload prediction according to the budget and performance objective, in some embodiments.

In some embodiments, scaling coordinator 510 may implement the following technique to assign a cluster to an incoming query. Active clusters are accepting new queries and will incur customer cost. Inactive clusters are not accepting new queries (for cost reasons) but are running existing queries and therefore incurring customer cost. Pending clusters are clusters that are being prepared by the burst manager but are not yet ready to run queries. Auto-task clusters are running at least one auto-task. They may also be running user queries. When a query arrives, the scaling coordinator 510 generates a list of candidates for clusters to run on. Candidates include all available clusters, including pending ones, and new burst clusters drawn from a hard-coded list of sizes: {2, 4, 8, 16, 32, 64}CNs. Each candidate has an associated runtime and billable cost, which is combined into alpha-price-performance. Candidates may additionally be marked ineligible due to budget or other constraints. Of the remaining eligible candidates, the one with the lowest alpha-price-performance is chosen.

When a query arrives, the scaling coordinator 510 generates a list of candidates for clusters to run on. Candidates include all available clusters, including pending ones, and new burst clusters drawn from a hardcoded list of sizes: {2, 4, 8, 16, 32, 64} CNs. Each candidate has an associated runtime and billable cost, which is combined into alpha-price-performance. Candidates may additionally be marked ineligible due to budget or other constraints. Of the remaining eligible candidates, the one with the lowest alpha-price-performance is chosen. Given a query q and candidate cluster c:

- Baseline Runtime (r_0): The scaling predictor provides an estimate of the expected runtime r_c on a cluster, along with a measure of uncertainty, e.g. standard deviation of the sample mean σc. Sample r_0 from N (rc, σc). Incorporating uncertainty has the benefit of helping to avoid repeating mistakes due to predictor inaccuracies
- Spilling Penalty (s) Let M be the output of the memory predictor (estimated peak memory). Let me be the maximum allowed per-query allocation on c. Estimate the effect of spilling on runtime as r0+γc(M−mc), where r0 is the execution time from the scaling predictor and γ is the average per-compute-node latency incurred per MB of spillage. γ is an empirically determined constant with units seconds-per-MB.
- Queuing Penalty (w): Maintain an exponentially weighted moving average (EWMA) of queueing head latency for each attached cluster, and use this to estimate how long q will have to wait in the queue before starting to execute. Note that queues are always emptied in FIFO order,
- Prepare Delay (p): If c is a new cluster, add a prepare delay to the runtime to reflect the time the query will have to wait before it can run on c. This is guc set to the P95 burst prepare time P, but could, in some embodiments, be adjusted based on observed prepare delays. If c is a pending cluster, this delay is the max(P−time spent preparing so far, P/4).

Billable Runtime (B): r_0+s. Intended to capture time the query is actually using cluster resources.

Billable Cost C: B*c*8 (c is the number of nodes), which reflects how much this query would bill if run in isolation.

Total Runtime (R): r_0+s+w+p. This is the estimated response time to the client.

Penalty: the alpha-price performance of this query: $RC_\alpha$. The query is assigned to the candidate cluster with the minimal penalty.

Ineligibility: A candidate cluster is ineligible if:
  It is active or pending and the incurred cost would exceed the available budget.
  It is inactive and the cost of running this cluster for 5 minutes (adjustable via GUC) would exceed the available budget.
  It is pending and the database has reached the maximum allowed number of burst clusters.

When a query is assigned to a particular burst cluster, it is allowed to run on any burst cluster of that size but may be not on any other cluster, in some embodiments. If a query is in the queue longer than GUC rightsizing_obey_scaling_duration_max_sec.

A solution is to modify the scaling predictor: Use data from actual runs of identical or similar queries and weight that more highly than the model-based prediction. This should provide more accurate predictions. Provide an uncertainty for the prediction: Var(E[R]), where R is the random variable for the runtime. Scaling coordinator 510 may use the uncertainty for Thomson sampling: given a set of candidates with penalties P_c(R) that are random variables, it chooses candidate c with probability Pr[Pc(R)=minc' Pc'(R)] In the above control flow, this is done by sampling r_0 from a normal distribution with the provided uncertainty, computing the penalty deterministically, and then choosing the cluster with the lowest penalty.

The control flow above acquires new clusters only in the case of a large query, whose runtime is long enough and which scales well enough to make a larger cluster worth the extra preparation time. However, it may be desirable to acquire a new cluster for shorter queries, e.g. in the presence of queueing. For this, use a loop that's separate from the above query flow. Every 10 seconds, a background task re-evaluates the activity group of every cluster and decide whether to acquire more. Pending clusters are easy since they have not been attached yet. However, other clusters may need to transition between active and inactive to avoid cost escalation. For example, if all clusters are kept active, each cluster may service a low load of queries, but the combination of clusters incurs a very large cost.

Scaling coordinator 510 keeps a history of the most recent 5 minutes of queries, along with their scaling runtime predictions. Let's suppose there are A attached active clusters, excluding main. Let S be a set of sets of clusters, comprising: All A clusters [1 set] The set of all but one of the attached active clusters [A sets] All A attached clusters plus one more of each size [A sets]. On each of these A+1 sets of clusters, replay the query history (using predicted runtimes, not actual) and obtain an average response time R and billed cost C. Choose the set with the best alpha-price-performance (R, C) that is also under budget for the 5-min interval. If the set is from (2), mark as inactive the cluster that was left out. If the set is from (3), prepare the extra cluster.

Resize management 514 may be responsible for determine the target size of the main cluster and the best value of a, in some embodiments, that produces the best performance for the given main cluster size and budget By default, resize management 514 runs once per day, but will run more often for new customers (every 10 min for the first two hours, then every hour for the first two days), in case need to resize more quickly for them. The input to the policy optimizer is a workload forecast, provided by workload prediction 524, which includes aggregated statistics of the predicted workload over the next day. Metrics needed from the forecast: peak memory distribution, runtime distribution, total scan size, and number of queries split out by memory buckets (bucket boundaries at 20% of total cluster memory for sizes {2, 4, 8, 16, 32, 64}). Total scan size is used to forecast the budget.

The following is an example algorithm to determine target cluster size using a slider that specifies different performance objectives:

```
Inputs : forecast F, current cluster state, performance objective
Outputs : {main size}
Parameters: budget_buffer = 0.8
Algorithm :
    budgets = [ ]
    While not aborted or timeout not reached:
        Produce a query trace Q from the forecast
        budget = forecasted budget of Q assuming current slider position
        For main size in {2,4,6,8..}:
            for alpha in (0.1, 0.5, 0.9, 1.3, 1.7):
                tot_pen[main size] = 0
                simulate scaling coordinator on Q
                and compute
                    tot_pen[main size, alpha] += cluster cost
        budgets += [budget]
main size, alpha = argmax tot_pen[main_size, alpha]
    s.t. tot_pen[main size, alpha] < |num_traces| * budget_buffer * mean(budget)
urgency = tot_pen[cur_size, cur_alpha] / tot_pen[main_size, alpha]
return main_size, alpha, urgency
```

Then, workload manager 536 may request scaling coordinator to assign query performance locally on main or remote. The assignment may be made and the query queued in queue 538. If locally executed, query execution 542 may instruct compute nodes to perform the cluster, as indicated at 504. For remote execution a request to perform the query on an additional cluster 506 may be sent.

Figure 6A:
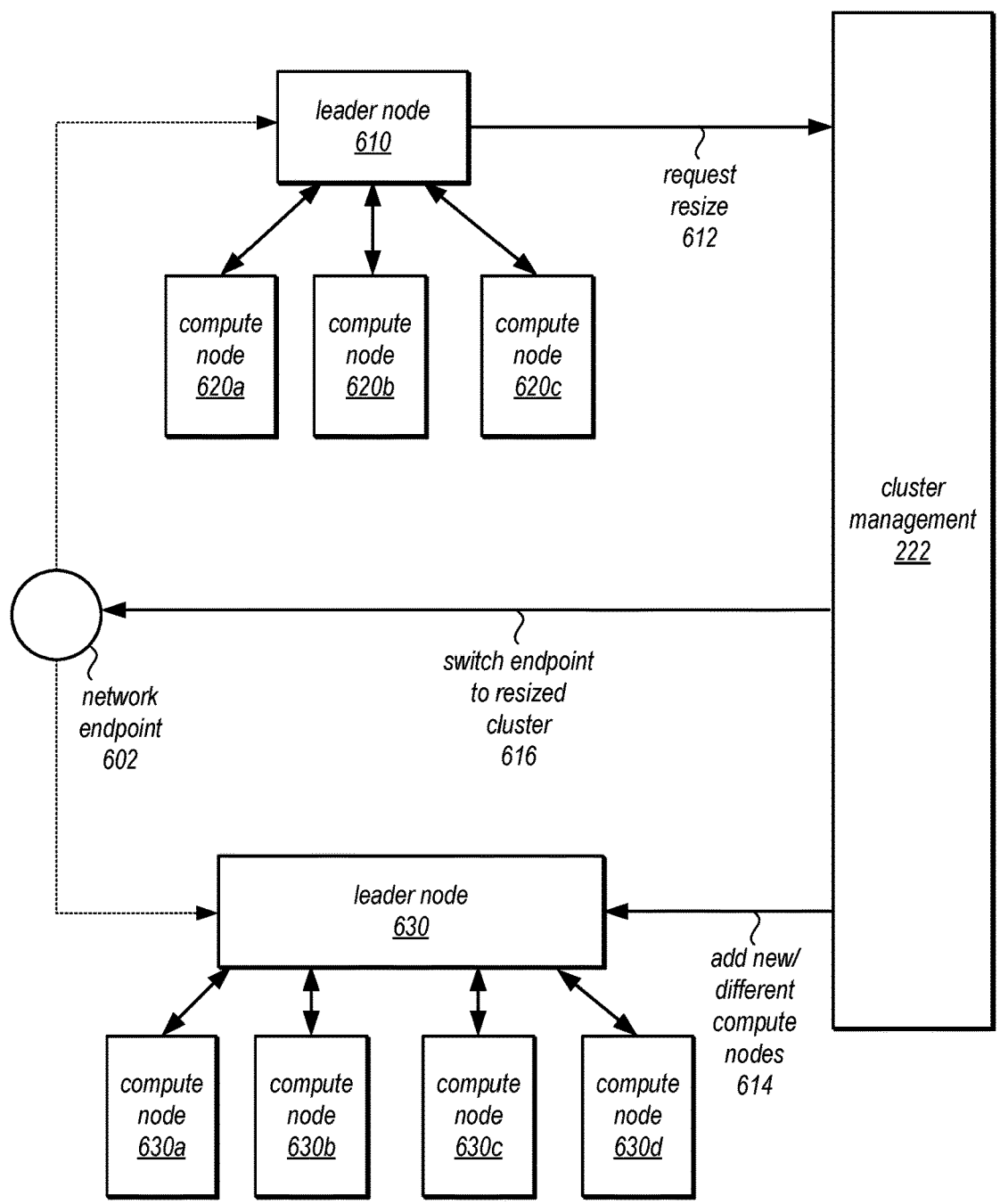
FIG. 6A is a logical block diagram illustrating a scaling action modify an existing processing cluster, according to some embodiments.

FIG. 6A is a logical block diagram illustrating a scaling action modify an existing processing cluster, according to some embodiments. Cluster with leader node 610 and compute nodes 620a through 620c may send a request to resize at 612 to cluster management. cluster management 222 may provision a new cluster with different compute nodes, as indicated at 614, with leader node 630, compute nodes 630a through 630d. As indicated at 616, the endpoint 602 for the database may be switched to leader node 630 after the resized cluster is ready.

Figure 6B:
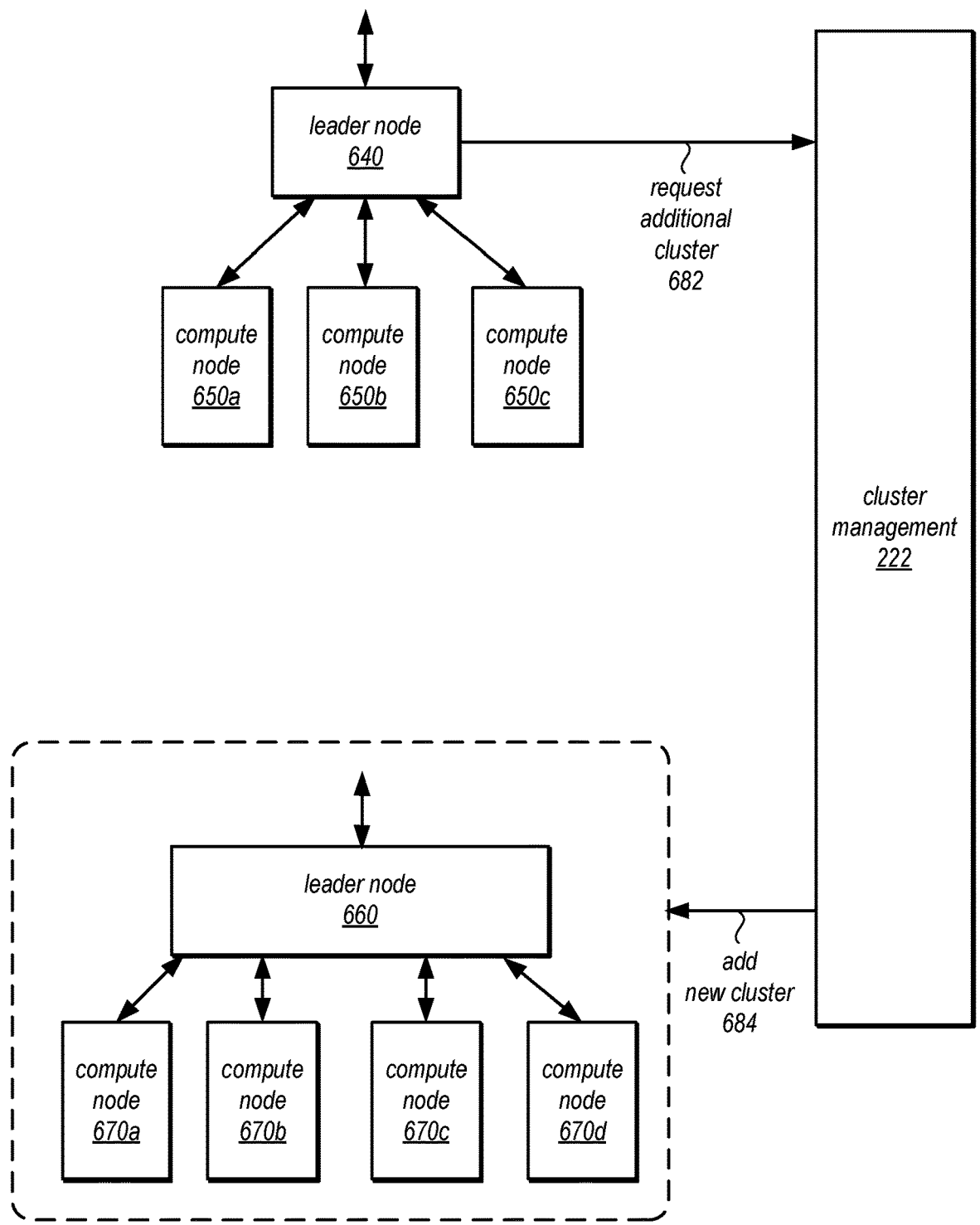
FIG. 6B is a logical block diagram illustrating a scaling action to add a further processing cluster, according to some embodiments.

FIG. 6B is a logical block diagram illustrating a scaling action to add a further processing cluster, according to some embodiments. Leader node 640 may request an additional cluster 682 from cluster management 222. Cluster management 222 may add the new cluster, as indicated at 684 (including leader node 660 and compute nodes 670a through 670d) to be available to perform queries sent from leader node 640.

Although FIGS. 2-6B have been described and illustrated in the context of a provider network implementing a database service, like a data warehousing service, the various components illustrated and described in FIGS. 2-6B may be easily applied to other database services that can utilize scaling query processing resources for efficient utilization and performance. As such, FIGS. 2-6B are not intended to be limiting as to other embodiments of predicting a future workload for scaling database processing resources for satisfying a performance objective.

Figure 7:
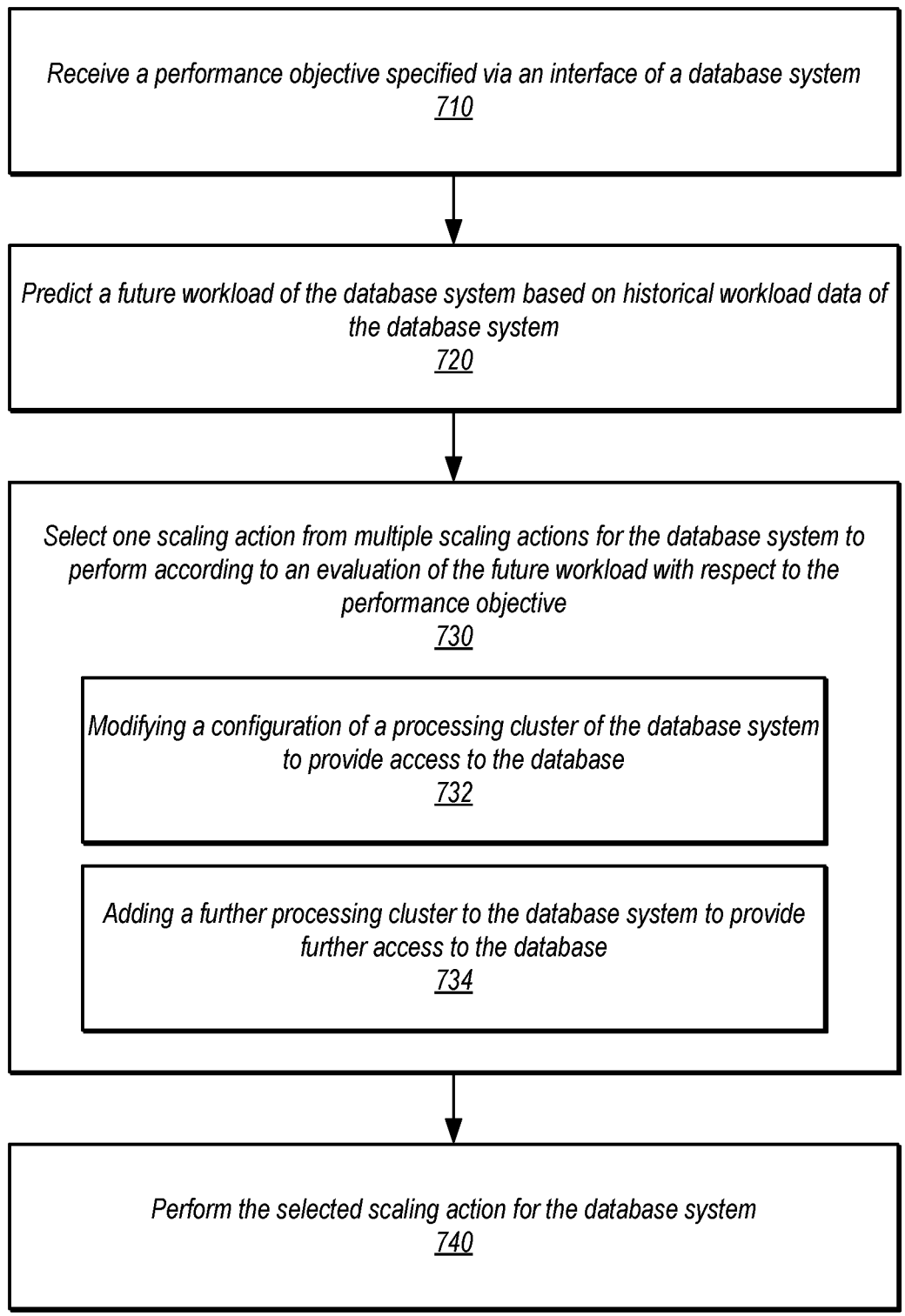
FIG. 7 is a high-level flowchart illustrating methods and techniques to implement predicting a future workload for scaling database processing resources for satisfying a performance objective, according to some embodiments.

FIG. 7 is a high-level flowchart illustrating methods and techniques to implement predicting a future workload for scaling database processing resources for satisfying a performance objective, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a second provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 710, a performance objective may be received via a specified interface, in some embodiments. For example, a slider, similar to the slider depicted in FIG. 3 or other user interface element may let a specified performance objective (e.g., between high performance (with high resource utilization being acceptable) to lower performance (with lower/more efficient resource utilization being acceptable). In some embodiments, the performance objective may correspond to different levels of aggressiveness as discussed above with regard to FIG. 5 and be used to set a budget.

As indicated at 720, a future workload of the database system may be predicted based on historical workload data of the database system, in some embodiments. For example, a machine learning model may be trained to forecast a number of database processing units (DPUs) (which may correspond to amount of processing to scan an amount of storage). The forecast may be made over a time horizon (e.g., 24 hours) and provide predict workload (e.g., in resources consumed, such as DPUs) for periods of time over the time horizon (e.g., how many DPUs to be used in each 5 minute interval).

As indicated at 730, one scaling action may be selected from multiple scaling actions for the database system to perform according to an evaluation of the future workload with respect to the performance objective, in some embodiments. These actions may include, as indicated at 732, modifying a configuration of a processing cluster of the database system to provide access to the database, and, as indicated at 734, adding a further processing cluster to the database system to provide further access to the database, in some embodiments. As discussed in detail above with regard to FIGS. 1 and 5, the performance objective may bias decisions to choose a more performant scaling decision (e.g., at the expense of greater resource utilization) or a less performant scaling decisions (e.g., at the expense of lesser performance). As indicted at 740, the selected scaling action may be performed for the database system, in some embodiments.

Figure 8:
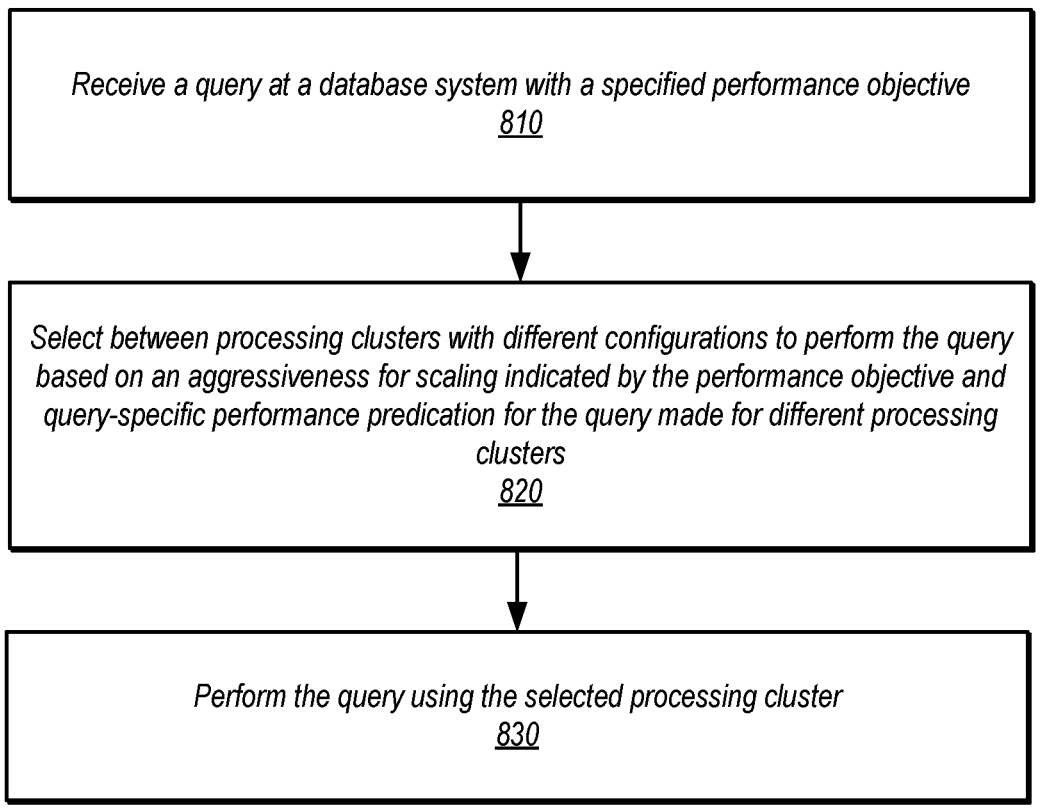
FIG. 8 is a high-level flowchart illustrating methods and techniques to implement selecting a processing cluster to perform a query according to a performance objective, according to some embodiments.

FIG. 8 is a high-level flowchart illustrating methods and techniques to implement selecting a processing cluster to perform a query according to a performance objective, according to some embodiments. As indicated at 810, a query at a database system with a specified performance objective. For example, a slider or other request, as discussed with regard to FIG. 3, may be used to specify the performance objective. The query may be received via a connection or other interface that sends the query to the database system (e.g., to a leader node of a main processing cluster).

As indicated at 820, the database system may select between processing clusters with different configurations to perform the query based on an aggressiveness for scaling indicated by the performance objective and query-specific performance prediction for the query made for different processing clusters, in some embodiments. For example, as discussed above with regard to FIG. 5, the different combinations of clusters may be used to determine whether the aggressiveness of the performance objective biases to a more or less performant cluster. As indicated at 830, the query may be performed using the selected processing cluster.

Embodiments of predicting a future workload for scaling database processing resources for satisfying a performance objective as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
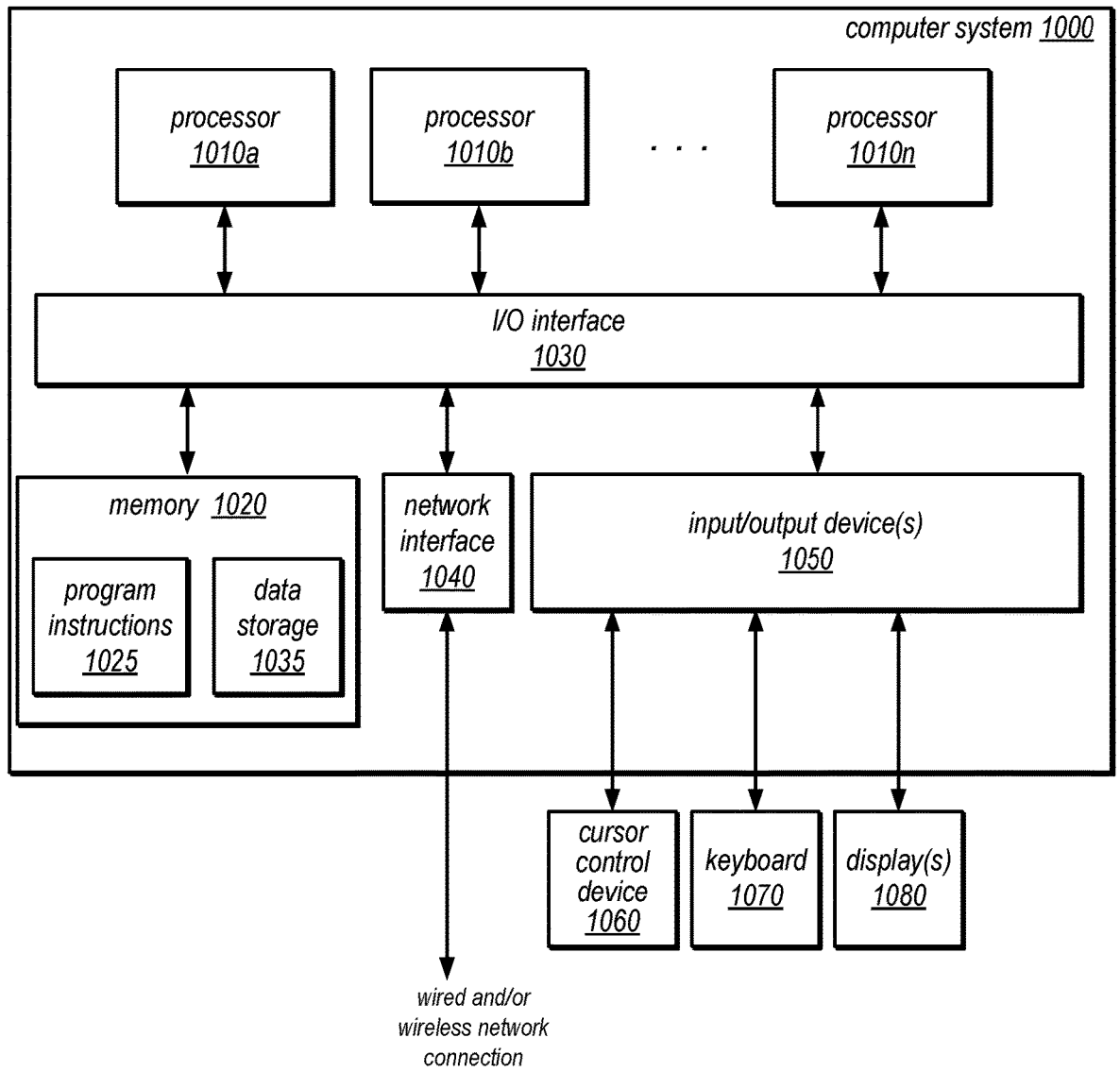
FIG. 9 illustrates an example system that implements the various methods, techniques, and systems described herein, according to some embodiments.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a plurality of computing devices, respectively comprising a processor and a memory that implement a database service, wherein the database service comprises:
        a main processing cluster that provides access to a database, wherein the main processing cluster is configured to:
            receive a performance objective specified via an interface of the database service;
            determine a performance budget for providing access to the database according to the performance objective;
            apply one or more machine learning models to historical workload data for the database to predict a future workload for the database;
            select one of a plurality of scaling actions for providing access to the database according to an evaluation of the future workload with respect to the performance budget, wherein the plurality of scaling actions comprise:
                resizing the main processing cluster; and
                adding a further processing cluster to provide access to the database; and
            cause performance of the selected scaling action for the database.

2. The system of claim 1, wherein the selected scaling action performs the resizing of the main processing cluster, wherein the resizing increases a number of nodes in the main processing cluster.

3. The system of claim 1, wherein the selected scaling action performs the adding the further processing cluster, wherein the adding makes the further processing cluster available to perform subsequent queries received at the further processing cluster and assigned to the further processing cluster based, at least in part, on a query performance prediction for the subsequent queries.

4. The system of claim 1, wherein the performance objective is specified via a slider graphical user element.

5. A method, comprising:
    receiving, by a database system, a performance objective specified via an interface of the database system, wherein the database system comprises at least one processing cluster to provide access to a database;
    predicting, by the database system, a future workload of the database system based, at least in part, on historical workload data of the database system;

selecting, by the database system, one of a plurality of scaling actions for the database system to perform according to an evaluation of the future workload with respect to the performance objective, wherein the plurality of scaling actions comprise:
    modifying a configuration of the at least one processing cluster to provide access to the database; and
    adding a further processing cluster to the database system to provide access to the database; and
performing, by the database system, the selected scaling action for the database system.

6. The method of claim 5, wherein the selected scaling action performs the modifying of the at least one processing cluster, wherein the modifying increases a number of nodes in the at least one processing cluster.

7. The method of claim 5, wherein the selected scaling action performs the modifying of the at least one processing cluster, wherein the modifying comprises including one or more nodes with different respective capacities of computing resources.

8. The method of claim 5, wherein the selected scaling action performs the modifying of the at least one processing cluster, wherein the modifying decreases a number of nodes in the at least one processing cluster.

9. The method of claim 5, wherein the selected scaling action performs the adding the further processing cluster to the database system, wherein the adding makes the further processing cluster available to perform subsequent queries received at the at least one processing cluster and assigned to the further processing cluster based, at least in part, on a query performance prediction for the subsequent queries.

10. The method of claim 5, further comprising determining a time to perform the selected scaling action based, at least in part, on the predicted workload.

11. The method of claim 5, further comprising;
    receiving, at the database system, a query;
    selecting, by the database system, between the at least one processing cluster and one or more other processing clusters with a different configuration than the at least one processing cluster to perform the query, wherein the selecting based on an aggressiveness for scaling indicated by the performance objective and a query-specific performance prediction for the query made for the one or more other processing clusters; and
    performing, by the database system, the query using the selected processing cluster.

12. The method of claim 5, wherein a time-based trigger to perform the selecting is specified via the interface of the database system.

13. The method of claim 5, wherein the performance objective is specified via a graphical user element.

14. One or more non-transitory, computer-readable storage media, storing program instructions that when executed on or across one or more computing devices cause the one or more computing devices to implement a database system that implements:
    determining a performance budget for the database system according to a performance objective specified via an interface of the database system, wherein the database system comprises at least one processing cluster to provide access to a database; predicting a future workload of the database system based, at least in part, on historical workload data of the database system;
    selecting one of a plurality of scaling actions for the database system to perform according to an evaluation of the future workload with respect to the performance budget, wherein the plurality of scaling actions comprise:
        modifying a configuration of the at least one processing cluster to provide access to the database; and
        adding a further processing cluster to the database system to provide access to the database; and
    causing performance of the selected scaling action for the database system.

15. The one or more non-transitory, computer-readable storage media of claim 14, wherein the selected scaling action performs the modifying of the at least one processing cluster, wherein the modifying increases a number of nodes in the at least one processing cluster.

16. The one or more non-transitory, computer-readable storage media of claim 14, wherein the selected scaling action performs the modifying of the at least one processing cluster, wherein the modifying decreases a number of nodes in the at least one processing cluster.

17. The one or more non-transitory, computer-readable storage media of claim 14, wherein the selected scaling action performs the adding the further processing cluster to the database system, wherein the adding makes the further processing cluster available to perform subsequent queries received at the at least one processing cluster and assigned to the further processing cluster based, at least in part, on a query performance prediction for the subsequent queries.

18. The one or more non-transitory, computer-readable storage media of claim 17, wherein the further processing cluster has a different configuration than the at least one processing cluster.

19. The one or more non-transitory, computer-readable storage media of claim 14, wherein the performance objective is specified via a slider graphical user element.

20. The one or more non-transitory, computer-readable storage media of claim 14, wherein the database system is a database service implemented as part of a provider network that stores the database in column-oriented fashion.

* * * * *